US009200535B2

(12) United States Patent
Rawlinson et al.

(10) Patent No.: US 9,200,535 B2
(45) Date of Patent: Dec. 1, 2015

(54) AEROFOIL BLADE OR VANE

(71) Applicant: ROLLS-ROYCE PLC, London (GB)

(72) Inventors: Anthony John Rawlinson, Derby (GB); Matthew Adams, Ilkeston (GB); Peter Philip Ramwell, Long Eaton (GB)

(73) Assignee: ROLLS-ROYCE plc, London (GB)

( * ) Notice: Subject to any disclaimer, the term of this patent is extended or adjusted under 35 U.S.C. 154(b) by 416 days.

(21) Appl. No.: 13/688,892

(22) Filed: Nov. 29, 2012

(65) Prior Publication Data

US 2013/0156603 A1 Jun. 20, 2013

(30) Foreign Application Priority Data

Dec. 15, 2011 (GB) .................................. 1121531.6

(51) Int. Cl.
*F03D 11/00* (2006.01)
*F01D 25/12* (2006.01)
*F01D 5/18* (2006.01)

(52) U.S. Cl.
CPC ................ *F01D 25/12* (2013.01); *F01D 5/187* (2013.01); *F05D 2250/185* (2013.01)

(58) Field of Classification Search
CPC ............. F01D 5/18; F01D 5/187; F01D 9/00; F01D 9/02; F01D 9/06; F01D 9/065; F01D 2260/20; F01D 5/186; F01D 5/188; F01D 5/189; F01D 2260/202; F01D 2260/2214; F01D 2260/22141; F01D 2250/185
USPC ...................... 415/115; 416/97 R, 96 R, 96 A
See application file for complete search history.

(56) References Cited

U.S. PATENT DOCUMENTS

| | | | | |
|---|---|---|---|---|
| 2,700,530 | A * | 1/1955 | Williams | 415/115 |
| 4,456,428 | A * | 6/1984 | Cuvillier | 416/97 R |
| 5,967,752 | A * | 10/1999 | Lee et al. | 416/97 R |
| 7,186,082 | B2 * | 3/2007 | Mongillo et al. | 416/1 |
| 2008/0044291 | A1 | 2/2008 | Lee et al. | |

FOREIGN PATENT DOCUMENTS

| | | | |
|---|---|---|---|
| GB | 2 112 468 | A | 7/1983 |

OTHER PUBLICATIONS

British Search Report issued in British Application No. 1121531.6 dated May 9, 2012.

* cited by examiner

*Primary Examiner* — Edward Look
*Assistant Examiner* — Jason Mikus
(74) *Attorney, Agent, or Firm* — Oliff PLC

(57) ABSTRACT

An aerofoil blade or vane for the turbine of a gas turbine engine is provided. The blade or vane includes an aerofoil portion which, in use, extends radially across a working gas annulus of the engine. A coolant inlet is formed at an end of the aerofoil portion for the entry of a cooling air flow into the portion. A corresponding coolant exhaust is formed at the trailing edge of the aerofoil portion for spent cooling air to flow from the portion. A passage within the aerofoil portion connects the inlet to the exhaust. A fence within the aerofoil portion extends radially and forwardly from a start position at the end of the aerofoil portion adjacent the trailing edge to an end position. The passage forms a loop which extends along one side of the fence, wraps around the end position, and extends along the other side of the fence.

11 Claims, 4 Drawing Sheets

AEROFOIL BLADE OR VANE

FIELD OF THE INVENTION

The present invention relates to an aerofoil blade or vane for the turbine of a gas turbine engine.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However as turbine entry temperatures increase, the life of an un-cooled turbine falls, necessitating the development of better materials and the introduction of internal air cooling.

In modern engines, the high-pressure turbine gas temperatures are hotter than the melting point of the material of the blades and vanes, necessitating internal air cooling of these airfoil components. During its passage through the engine, the mean temperature of the gas stream decreases as power is extracted. Therefore, the need to cool the static and rotary parts of the engine structure decreases as the gas moves from the high-pressure stage(s), through the intermediate-pressure and low-pressure stages, and towards the exit nozzle.

FIG. 2 shows an isometric view of a typical single stage cooled turbine. Cooling air flows to are indicated by arrows.

Internal convection and external films are the prime methods of cooling the gas path components—airfoils, platforms, shrouds and shroud segments etc. High-pressure turbine nozzle guide vanes 31 (NGVs) consume the greatest amount of cooling air on high temperature engines. High-pressure blades 32 typically use about half of the NGV flow. The intermediate-pressure and low-pressure stages downstream of the HP turbine use progressively less cooling air.

The high-pressure turbine airfoils are cooled by using high pressure air from the compressor that has by-passed the combustor and is therefore relatively cool compared to the gas temperature. Typical cooling air temperatures are between 800 and 1000 K, while gas temperatures can be in excess of 2100 K.

The cooling air from the compressor that is used to cool the hot turbine components is not used fully to extract work from the turbine. Therefore, as extracting coolant flow has an adverse effect on the engine operating efficiency, it is important to use the cooling air effectively.

Ever increasing gas temperature levels combined with a drive towards flatter combustion radial profiles, in the interests of reduced combustor emissions, have resulted in an increase in local gas temperature experienced by the extremities of the blades and vanes, and the working gas annulus endwalls.

A turbine blade or vane has a radially extending aerofoil portion with facing suction side and pressure side walls. These aerofoil portions extend across the working gas annulus.

Cooling passages within the aerofoil portions of blades or vanes is fed cooling air by inlets at the ends of the aerofoil portions. Cooling air eventually leaves the aerofoil portions through exit holes at the trailing edges and, in the case of blades, the tips. Some of the cooling air, however, can leave through effusion holes formed in the suction side and pressure side walls. The block arrows in FIG. 2 show the general direction of cooling air flow.

FIG. 3 shows schematically a longitudinal cross-section through the interior of the aerofoil portion of a blade or vane, the cross-section containing the leading L and trailing T edges of the aerofoil portion, and the cross-section being a "negative" such that spaces or voids are shown as solid. Air (indicated by arrows) is bled into the aerofoil section at an inlet 33 in approximately the radial direction, travels along a radially extending passage 34, and exhausts from the trailing edge at about 90° to the radial direction. The peak thermal load is generally towards the centre of the aerofoil is, as indicated in FIG. 3. However, in order to provide an aerodynamically desirable uniform distribution of cooling air flow along the trailing edge, most of the coolant either passes through the hottest section of the aerofoil portion is only briefly or not at all. More particularly, a major disadvantage of this arrangement is that any cooling air diverted to the lower part of the trailing edge performs no function in the region of most concern, while the cooling air exhausted above the peak load region does not do as much work as it might.

SUMMARY OF THE INVENTION

The present invention is conceived with an aim of improving utilisation of cooling air in blades or vanes.

Accordingly, in a first aspect, the present invention provides an aerofoil blade or vane for the turbine of a gas turbine engine, the blade or vane including:

an aerofoil portion which, in use, extends radially across a working gas annulus of the engine, a coolant inlet being formed at an end of the aerofoil portion for entry of a flow of cooling air into the aerofoil portion, a corresponding coolant exhaust being formed at the trailing edge of the aerofoil portion for the flow of spent cooling air from the aerofoil portion, and a passage within the aerofoil portion connecting the inlet to the exhaust, and a fence within the aerofoil portion, the fence extending radially and forwardly from a start position at said end of the aerofoil portion adjacent the trailing edge to an end position;

wherein the passage forms a loop which extends along one side of the fence, wraps around the end position, and extends along the other side of the fence to connect the inlet to the exhaust.

By forcing the cooling air in the passage to flow along such a loop, more cooling air can be made to pass through the hottest section of the aerofoil portion.

In a second aspect, the present invention provides gas turbine engine having one or more aerofoil blades or vanes according to the first aspect.

Optional features of the invention will now be set out. These are applicable singly or in any combination with any aspect of the invention.

The blade or vane may be a turbine blade or a nozzle guide vane, for example, for use in a high pressure turbine of a gas turbine engine.

The aerofoil blade or vane may have a plurality of coolant inlets formed at the end of the aerofoil portion for entry of respective flows of cooling air into the aerofoil portion, a plurality of corresponding coolant exhausts formed at the trailing edge of the aerofoil portion for the exhaust of spent cooling air from the aerofoil portion, and a plurality of respective passages within the aerofoil portion connecting the inlets to the exhausts; wherein the passages form a set of nested loops, each loop connecting a respective inlet to a corresponding exhaust; and wherein the innermost of the nested loops extends along one side of the fence, wraps around the end position, and extends along the other side of the fence. By nesting the loops in this way, further improvement in cooling air utilisation can be achieved.

The end position may be at a radial distance of greater than 60% of the radial length of the aerofoil portion from the start position. The end position may be at a radial distance of less than 80% of the radial length of the aerofoil portion from the start position.

The end position may be forward of the start position by a distance which is greater than 50% of the distance from the trailing edge to the leading edge of the of the aerofoil portion. The end position may be forward of the start position by a distance which is less than 80% of the distance from the trailing edge to the leading edge of the of the aerofoil portion.

The angle between the fence and a radial line at the trailing edge may be in the range from 30° to 60°.

The or each passage may be configured such that the angle between the flow of cooling air into the passage and the flow of spent cooling air from the passage is in the range from 80° to 100°.

The or each passage may contain surface formations, such as trip steps and/or pedestals, to enhance heat transfer from the aerofoil portion to the cooling air.

The or each passage may be bounded on one side by the suction side wall of the aerofoil portion and on an opposing side by an internal wall of the aerofoil portion.

A plurality of effusion holes, e.g. for surface film cooling of the aerofoil portion, may extend from the or each passage to the outer surface of the aerofoil portion. The effusion holes thus allow the cooling air to flow from the passage into the working gas annulus.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
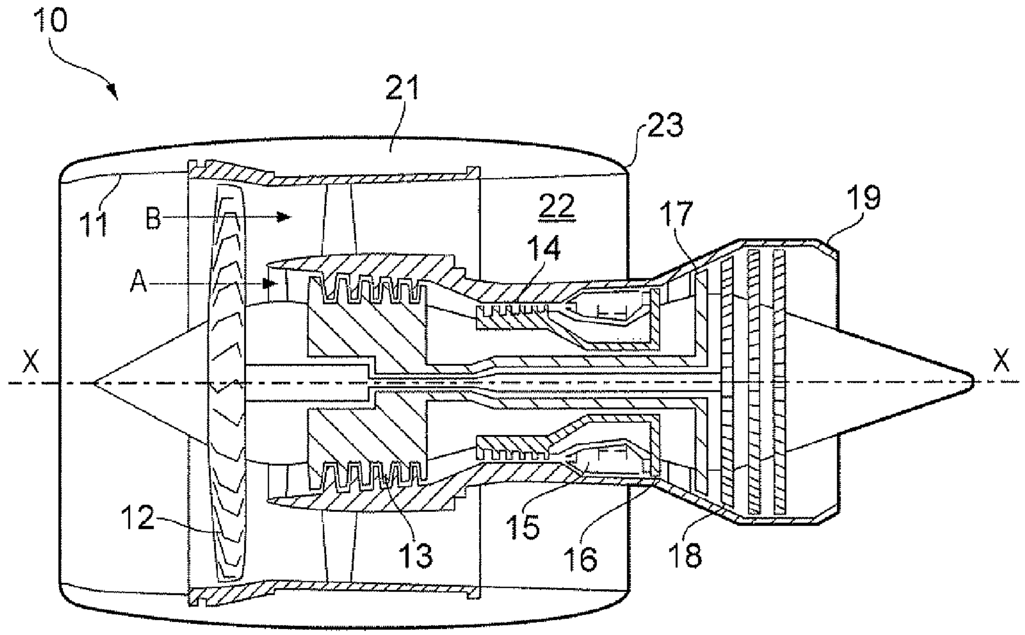
FIG. 1 shows schematically a longitudinal cross-section through a ducted fan gas turbine engine.
Figure 2:
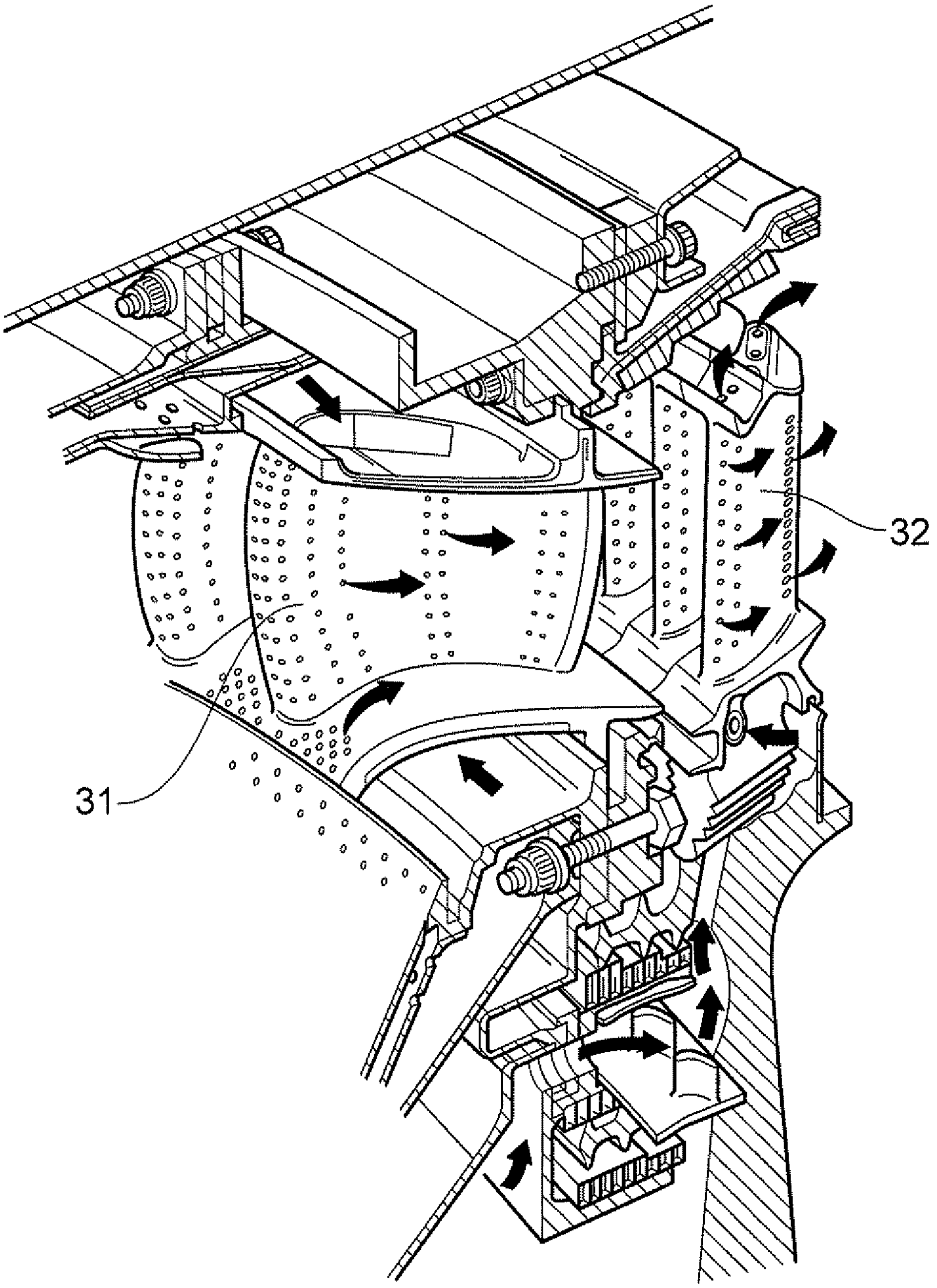
FIG. 2 shows an isometric view of a typical single stage cooled turbine.
Figure 3:
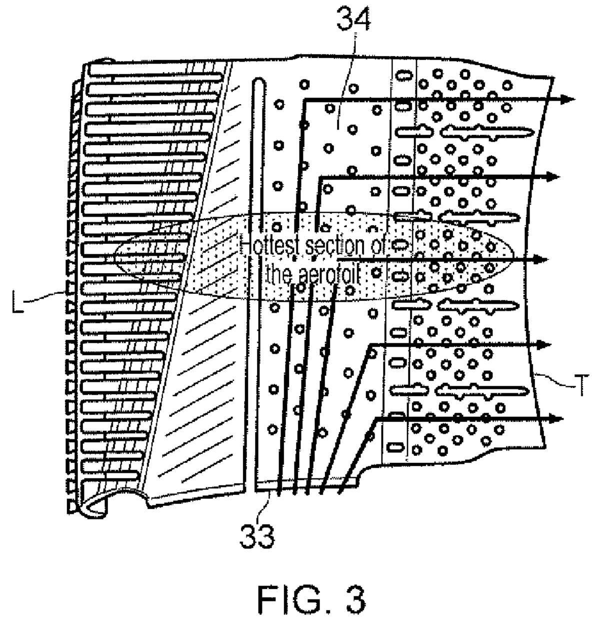
FIG. 3 shows schematically a cross-section through the interior of the aerofoil portion of a blade or vane, the cross-section being a "negative" such that spaces or voids are shown as solid.
Figure 4:
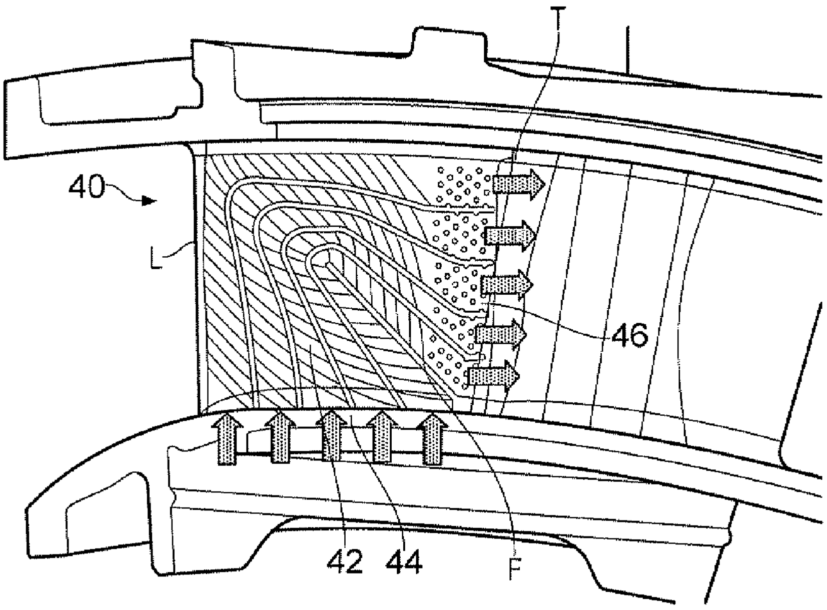
FIG. 4 shows a general view of two adjacent NGVs of a high pressure turbine, the view including selected internal details.
Figure 5:
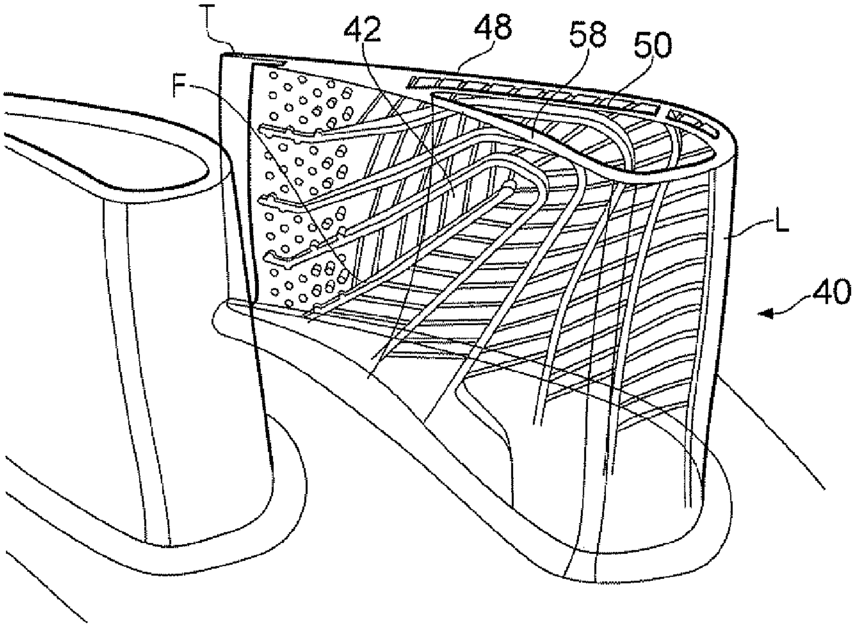
FIG. 5 shows a further general view of the NGVs of FIG. 4, the NGVs being sectioned at a position adjacent the outer wall of the working gas annulus.
Figure 6:
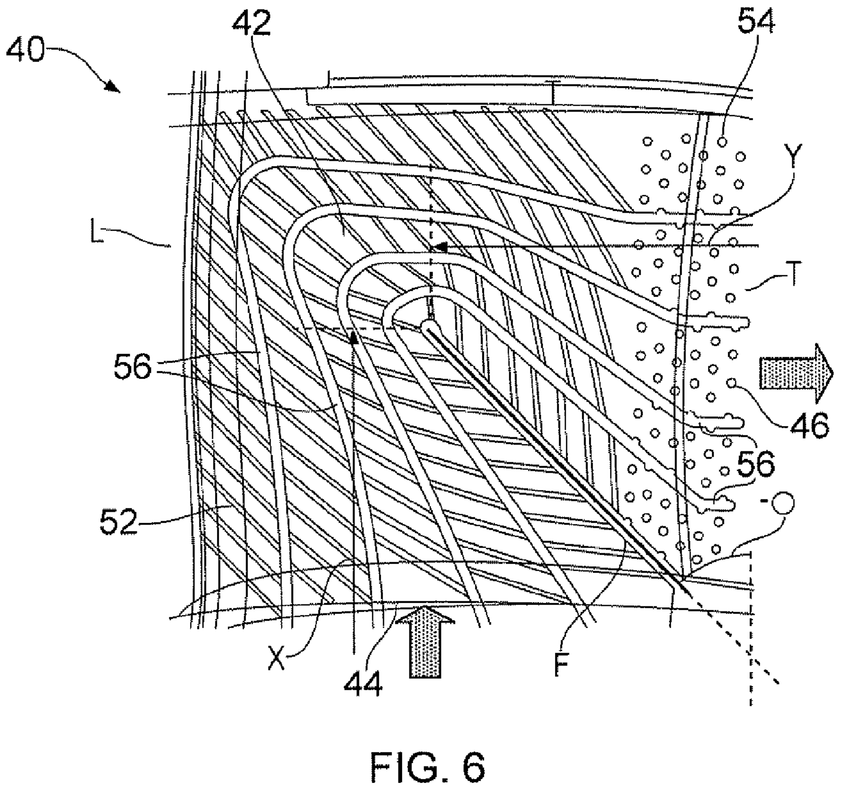
FIG. 6 shows a longitudinal cross-section through the interior of the aerofoil portion of one of the NGVs of FIGS. 4 and 5.

FIG. 4 shows a general view of two adjacent NGVs of a high pressure turbine, the view including selected internal details. FIG. 5 shows a further general view of the NGVs of FIG. 4, the NGVs being sectioned at a position adjacent the outer wall of the working gas annulus. FIG. 6 shows a longitudinal cross-section through the interior of the aerofoil portion of one of the NGVs of FIGS. 4 and 5.

Each NGV has an aerofoil portion 40 having a pressure side wall 58 and a suction side wall 48 with a leading edge L and a trailing edge T. The aerofoil portion contains a plurality of passages 42 which each receive a flow cooling air from a respective inlet 44 at the radially inward, base end of the aerofoil portion and send the air to a respective exhaust 46 at the trailing edge. The inlet and exhaust flow directions are at about 90° to each other, as indicated by the block arrows in FIGS. 4 and 6. As best seen in FIG. 5, the passages are defined by passage wall 56 and bounded on one side by the suction side wall 48 of the aerofoil portion and at the opposing side by an internal wall 50.

The passages 42 contain trip steps 52 and pedestals 54 to enhance heat transfer from the walls of the passages into the cooling air flows.

The aerofoil portion 40 contains a fence F which extends from a start position in a substantially straight line from the base end of the aerofoil portion adjacent the trailing edge T to an end position which is: (i) at a radial distance X of greater than 50% but less than 80% of the radial length of the aerofoil portion from the start position, and (ii) forward of the start position by a distance Y which is greater than 50% but less than 80% of the distance from the trailing edge to the leading edge L. The angle Θ between the fence and the radial direction at the trailing edge is generally in the range from 30° to 60°.

The passages 42 are nested around the fence F, with the innermost passage of the nest extending along one side of the fence, wrapping around the end position, and extending along the other side of the fence. In this way more cooling air is guided along flow paths which traverse the centre of the component where the aerofoil is hottest. For example, even cooling air which eventually exits from the exhausts 46 closest to the base of the aerofoil portion has to make two passes through the region of peak thermal load.

The fence F and passages 42 thus force more of the cooling air to work harder around the centre of the aerofoil portion, results in a reduced peak temperature at the trailing edge T.

The number and shape of the passages 42, flow rate through each passage, and positioning and number of trip steps 52 and pedestals 54 can be the subject of an optimisation exercise e.g. to reduce or minimise the cooling air flow requirement, achieve target peak temperatures or temperature distributions etc. Effusion holes (not shown in FIGS. 4 to 6) may extend from the passages to the outer surface of the aerofoil portion 40 for surface film cooling of the aerofoil portion.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An aerofoil blade or vane for the turbine of a gas turbine engine, the blade or vane including:

an aerofoil body comprising a base end, a trailing edge, a leading edge and an internal space and which, in use, extends radially across a working gas annulus of the engine, a coolant inlet being formed at the base end of the aerofoil body for entry of a flow of cooling air into the internal space, a corresponding coolant exhaust being formed at the trailing edge of the aerofoil body for the flow of spent cooling air from the internal space, and a passage within the internal space determining the route of cooling air and connecting the inlet to the exhaust, a first wall of the passage comprising a fence within the internal space, the fence extending at an acute angle to a radial line at the trailing edge from a start position at the base end of the aerofoil body adjacent the trailing edge to an end position in a mid-region of the internal space, and a second wall of the passage extending around the fence at an acute angle to the radial line at the trailing edge, the second wall extending substantially parallel to the fence from a start position at the base end of the aerofoil body on a first side of the fence to the mid-region of the internal space, and extending substantially parallel to the fence from the mid-region to an end position on a second side of the fence, the end position of the second wall being adjacent the base end and the trailing edge, wherein the passage loops around the fence thereby routing cooling air from the inlet first towards the leading edge of the aerofoil body and then turning the cooling air back towards the trailing edge exhaust.

2. An aerofoil blade or vane according to claim 1 which has a plurality of coolant inlets formed at the base end of the aerofoil body for entry of respective flows of cooling air into the internal space, a plurality of corresponding coolant exhausts formed at the trailing edge of the aerofoil body for the exhaust of spent cooling air from the internal space, and a plurality of second walls defining respective additional passages within the aerofoil body connecting the inlets to the exhausts;

wherein the additional passages form a set of nested loops, each loop connecting a respective inlet to a corresponding exhaust; and wherein the innermost of the nested loops extends around the fence thereby routing cooling air from the inlet first towards the leading edge of the aerofoil body and then turning the cooling air back towards the trailing edge exhaust.

3. An aerofoil blade or vane according to claim 1, wherein the end position of the first z all is at a radial distance of greater than 50% of the radial length of the aerofoil body from the start position.

4. An aerofoil blade or vane according to claim 3, wherein the end position of the first wall is at a radial distance of less than 80% of the radial length of the aerofoil body from the start position.

5. An aerofoil blade or vane according to claim 1, wherein the end position of the first all is forward of the start position by a distance which is greater than 50% of the distance from the trailing edge to the leading edge of the aerofoil body.

6. An aerofoil blade or vane according to claim 5, wherein the end position of the first wall is forward of the start position by a distance which is less than 80% of the distance from the trailing edge to the leading edge of the aerofoil body.

7. An aerofoil blade or vane according to claim 1, wherein the angle ($\Theta$) between the fence and the radial line at the trailing edge is in the range from 30° to 60°.

8. An aerofoil blade or vane according to claim 1, wherein the passage is configured such that the angle between the flow of cooling air into the passage and the flow of spent cooling air from the passage is in the range from 80° to 100°.

9. An aerofoil blade or vane according to claim 1, wherein the passage contains surface formations to enhance heat transfer from the aerofoil body to the cooling air.

10. An aerofoil blade or vane according to claim 2, wherein the passage is bounded on one side by the suction side wall of the aerofoil body and on an opposing side by an internal wall of the aerofoil body.

11. A gas turbine engine having one or more aerofoil blades or vanes according to claim 1.

* * * * *